Oct. 9, 1928.

G. BODEN ET AL

DOUBLE POINTED PIN FASTENER

Re. 17,099

Original Filed June 22, 1926

Inventors:
George Boden
George A. King
Lyman Burton Chapman
by Wm. H. Lincoln
Attorney.

Reissued Oct. 9, 1928.

Re. 17,099

UNITED STATES PATENT OFFICE.

GEORGE BODEN, GEORGE A. KING, AND LYMAN BURTON CHAPMAN, OF WATERBURY, CONNECTICUT, ASSIGNORS TO SCOVILL MANUFACTURING COMPANY, OF WATERBURY, CONNECTICUT, A CORPORATION OF CONNECTICUT.

DOUBLE-POINTED PIN FASTENER.

Original No. 1,604,801, dated October 26, 1926, Serial No. 117,841, filed June 22, 1926. Application for reissue filed May 23, 1927. Serial No. 193,752.

DIVISION A.

The object of this invention is to provide a double-pointed pin fastening device, especially one designed for use of automobile trimmers to pin or attach seat and other covers to the fabric on the inside of automobiles.

Fastening devices of the type represented in this invention are usually provided with a cap made as a metal shell and attached to the pin in a variety of ways. In the case of single-pointed pins, the head of the pin has been made usually of ring form, and the cap made with a flanged rim in which the ring is mounted. In the case of a double-pointed pin, having a cap, it is expensive to make the cap-engaging end or head of the pin in the form of a ring, and it is difficult and expensive to connect the double-pointed pin head and the cap and to prevent relative turning of the pin within the cap. The limbs of the double-pointed pins tend to approach one another in the act of setting.

Our invention consists of a double-pointed pin, having a looped head bent over substantially parallel with the limbs of the pin and spaced apart from the limbs so as to form a cap-engaging head which is engaged by the cap at opposite points, instead of circularly, as in the case of a ring.

The invention also consists of a double-pointed pin having a retaining prong integral with the cap and adapted to automatically engage the fabric on which the pin is used and from which it may be disengaged as desired.

The invention also consists of a double-pointed pin, having means for separating the limbs of the pin and preventing them from approaching in use.

Figure 1:
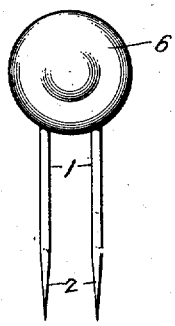
Figure 2:
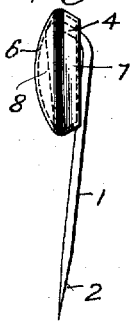
Figure 3:
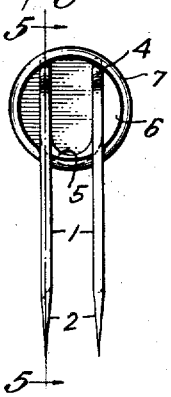
Figure 4:
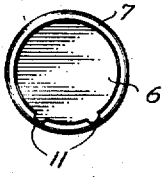
Figure 5:
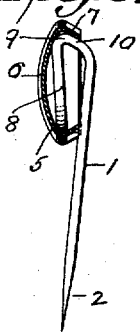
Figure 6:
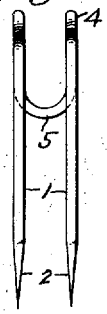
Figure 7:
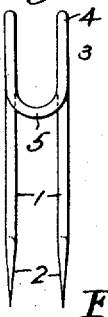
Figure 12:
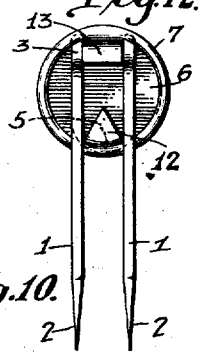
Figure 9:
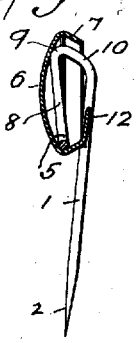
Figure 8:
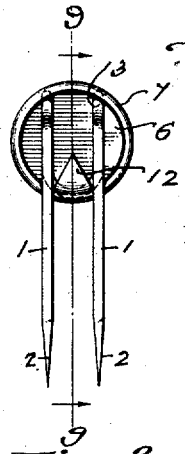
Figure 11:
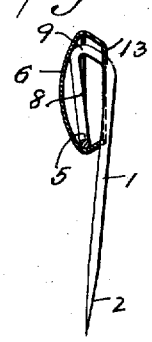
Figure 10:
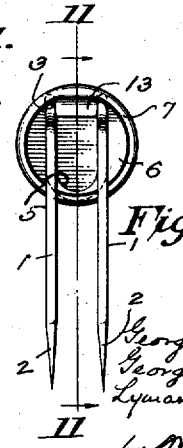

In the accompanying drawings illustrating the invention, in the several figures of which like parts are similarly designated, Figure 1 is a front elevation, Fig. 2 is a side elevation, and Fig. 3 is a rear elevation, illustrating one embodiment of the invention. Fig. 4 is a rear elevation of the shell-like cap. Fig. 5 is a section on line 5—5 of Fig. 3. Fig. 6 is a rear elevation, and Fig. 7 a front elevation of the double-pointed pin detached. Fig. 8 is a rear elevation, and Fig. 9 is a section on line 9—9 of Fig. 8, illustrating the automatically operating retaining prong. Fig. 10 is a rear elevation, and Fig. 11 a section on line 11—11 of Fig. 10, illustrating the separating feature. Fig. 12 is a rear elevation, illustrating the use of both prong and lug.

The double-pointed pin is conveniently made of suitable wire with the free ends or limbs pointed, and the looped end bent over and humped at the top so as to fit within the shell which forms the cap. 1 designates the limbs, 2 their pointed ends, 3 the looped head having the humped portion 4 which engages the upper portion of the cap and the bend 5 which engages the lower portion of the cap, and 6 is the cap having the flanged rim 7 which confines the head of the pin within the cap in a rigid, fixed or stationary manner.

The looped and humped end or head of the pin differs from any other to us known, in that it is bent back upon the limbs and parallel or in alignment with said limbs, the portions 8 thereof being straight, instead of circular, and the bend 5 fitting within the cap and held by its flange 7, and the humped portion 4 having the apexial ends 9 next to the straight portions 8 shaped to engage the cap within its flange 7, and thence slanting outwardly, as at 10, and merging with the limbs and carrying said limbs outside of the cap, so that said limbs may be engaged with the article to which the pin is applied as a fastener.

The limbs engage the notches 11 in the lower edge of the flange 7 so as to be held spaced apart and aid in preventing relative movement of the cap and pin.

The pin with its described head is capable of economical manufacture and ready assembly with the cap, with the tendency of relative movement of the cap and pin reduced if not entirely eliminated.

The cap may be provided with an inverted V shaped prong 12 projecting upwardly and outwardly at an angle from the lower portion of the flange and between the limbs of the pin, and of a width at its base about equal to the distance between said limbs so as to hold the limbs apart. This prong is fixed and adapted to engage automatically the fabric on which the fastener is used to prevent the accidental escape of the fastener, and after such engagement the fabric is held in place through the resilient tendencies of the limbs of the pin. In order to disengage the prong from the fabric, a sharp tool, such as a thin knife blade, may be inserted between the fabric and the bottom of the cap, to thereby force the limbs of the pin away from the fixed prong and lessen the friction set up by the resilient limbs of the pin, as well as forcing the fabric ahead of the leading edge over the point of the prong. When this tool reaches the head of the prong it covers it, as it were, and prevents a further tendency towards locking in the process of disengaging. Inasmuch as the limbs of the pin are resilient, they will tend to revert to their normal position after the tool has been removed.

In order further to insure the relative immovability of the cap and pin and to effect the holding apart of the limbs of the pin, there may be provided the lug 13 projecting from the upper edge of the flange 7 of the cap and entering the space between the limbs of the pin in the head thereof. As shown in Fig. 12, both prong 12 and lug 13 may be used in a pin fastener.

Variations in the details of construction are permissible within the principle of the invention and the scope of the claims following.

What we claim is:—

1. A double-pointed pin fastener, having a cap, and a double-pointed pin having its head formed by bending over and humping its looped end and engaging the cap, and an upwardly and outwardly extending prong projecting from the lower edge of the cap between the limbs of the pin.

2. A double-pointed pin fastener, having a cap, and a double-pointed pin having its head formed by bending over and humping its looped end and engaging the cap, a retaining prong extending from the lower part of the cap between the limbs of the pin and adapted to engage the fabric to which the device is applied and to be separated therefrom, and a lug extending from the upper edge of the cap between the limbs of the pin to keep said limbs spaced apart and also to prevent relative rotation of the cap and pin.

In testimony whereof we have hereunto set our hands this 18th day of May, A. D. 1927.

GEORGE BODEN.
GEORGE A. KING.
LYMAN BURTON CHAPMAN.